United States Patent
Rice

(10) Patent No.: US 10,704,214 B1
(45) Date of Patent: Jul. 7, 2020

(54) STRIPING SYSTEM AND METHOD

(71) Applicant: Timothy Todd Rice, Ashville, OH (US)

(72) Inventor: Timothy Todd Rice, Ashville, OH (US)

( * ) Notice: Subject to any disclaimer, the term of this patent is extended or adjusted under 35 U.S.C. 154(b) by 236 days.

(21) Appl. No.: 16/055,116

(22) Filed: Aug. 5, 2018

(51) Int. Cl.
| | |
|---|---|
| *E01C 23/16* | (2006.01) |
| *E01C 23/22* | (2006.01) |
| *G01C 15/00* | (2006.01) |
| *G01B 11/25* | (2006.01) |
| *B05B 13/00* | (2006.01) |

(52) U.S. Cl.
CPC ............ *E01C 23/163* (2013.01); *E01C 23/22* (2013.01); *G01B 11/25* (2013.01); *G01C 15/004* (2013.01); *B05B 13/005* (2013.01)

(58) Field of Classification Search
CPC ...... E01C 23/163; E01C 23/16; E01C 23/222; E01C 23/22; E01C 23/227; G01C 15/004; G01C 15/105
See application file for complete search history.

(56) References Cited

U.S. PATENT DOCUMENTS

| | | | | |
|---|---|---|---|---|
| 1,928,551 | A * | 9/1933 | Ball | E01C 23/225 |
| | | | | 33/264 |
| 2,555,954 | A * | 6/1951 | Brufiat | A01B 69/001 |
| | | | | 33/264 |
| 4,517,749 | A * | 5/1985 | Scotto | G01C 15/105 |
| | | | | 33/275 R |
| 5,302,207 | A * | 4/1994 | Jurcisin | E01C 23/22 |
| | | | | 118/207 |
| 5,481,809 | A * | 1/1996 | Rooney | G01C 15/105 |
| | | | | 33/392 |
| 5,539,990 | A * | 7/1996 | Le | G01C 15/004 |
| | | | | 33/283 |
| 5,782,003 | A * | 7/1998 | Bozzo | G01C 15/004 |
| | | | | 33/291 |
| 6,101,728 | A * | 8/2000 | Keng | G01C 15/105 |
| | | | | 33/281 |
| 7,178,250 | B2 * | 2/2007 | Nash | G01C 15/004 |
| | | | | 33/286 |
| 9,644,331 | B2 * | 5/2017 | Vanneman | E01C 23/122 |
| 2004/0172836 | A1 * | 9/2004 | Ng | G01C 15/10 |
| | | | | 33/286 |
| 2011/0265336 | A1 * | 11/2011 | Bascom | G01C 15/004 |
| | | | | 33/286 |
| 2012/0144682 | A1 * | 6/2012 | Vinati | B66C 13/46 |
| | | | | 33/263 |
| 2017/0218578 | A1 | 8/2017 | Vanneman et al. | |

* cited by examiner

*Primary Examiner* — Christopher W Fulton
(74) *Attorney, Agent, or Firm* — Ronald J Koch

(57) ABSTRACT

A laser is pivotally attached to a line striping machine. The laser projects a planar line outwardly from the line striping machine. The laser freely rotates about a longitudinal axis, under the influence of gravity, relative to the line striping machine, independent of the orientation of the line striping machine, so as to project a vertically planar line regardless of the vertical orientation of the line striping machine. The subject technology compensates for changes in surface contour by providing a rotating laser that projects a vertically compensated projection plane that causes a vertically compensated reference line projected upon the surface.

1 Claim, 4 Drawing Sheets

STRIPING SYSTEM AND METHOD

BACKGROUND AND SUMMARY

The present invention relates generally to line striping systems, and more specifically to laser assisted line striping systems.

Conventional laser assisted line striping systems project a reference line onto a surface (e.g. a parking lot) to allow a line to be painted (aka striped) onto the surface by the line striping machine as a user of the machine follows the reference line. Conventional laser assisted line striping systems are problematic in that they cannot compensate for certain changes in surface contour (e.g. lateral changes in grade). In other words, the reference line is skewed when the line striping machine becomes non-horizontal. There is therefore a need for a technology that compensates for such changes in topography.

In one aspect of the subject technology, a laser is pivotally attached to a line striping machine. The laser projects a planar line outwardly from the line striping machine. The laser freely rotates about a longitudinal axis, under the influence of gravity, relative to the line striping machine, independent of the orientation of the line striping machine, so as to project a vertically planar line regardless of the vertical orientation of the line striping machine.

If the line striping machine encounters a contour change from horizontal to non-horizontal, the subject technology compensates for such changes in topology by projecting a vertically compensated projection plane that causes a vertically compensated reference line to be projected upon the surface. A conventional system would result in a skewed projection plane that would project a skewed line upon a surface. A user following the skewed line would paint a skewed stripe.

In one aspect, the laser is operatively attached to a vertical compensator housing that is pivotally attached to the line striping machine. The vertical compensator housing is adapted to freely rotate about a longitudinal axis in the manner described above.

In one aspect, a line display system is mounted to the line striping machine. In one aspect, the line display system is mounted to a handle bar of the line striping machine; the line display system comprises a support arm operatively connected to a support arm housing, and a vertical compensator housing is pivotally attached to the support arm such that the vertical compensator housing freely rotates about a longitudinal axis in the manner described above.

In one aspect, the laser is operatively connected to a laser harness assembly, and the laser harness assembly is attached to the top of the vertical compensator housing. In one aspect, the laser harness assembly 11 has a u-shaped cross section forming an upwardly oriented channel into which the laser is mounted.

BRIEF DESCRIPTION OF THE DRAWINGS

Further features of the inventive embodiments will become apparent to those skilled in the art to which the embodiments relate from reading the specification and claims with reference to the accompanying drawings, in which:

REFERENCE NUMERALS

Figure 1:
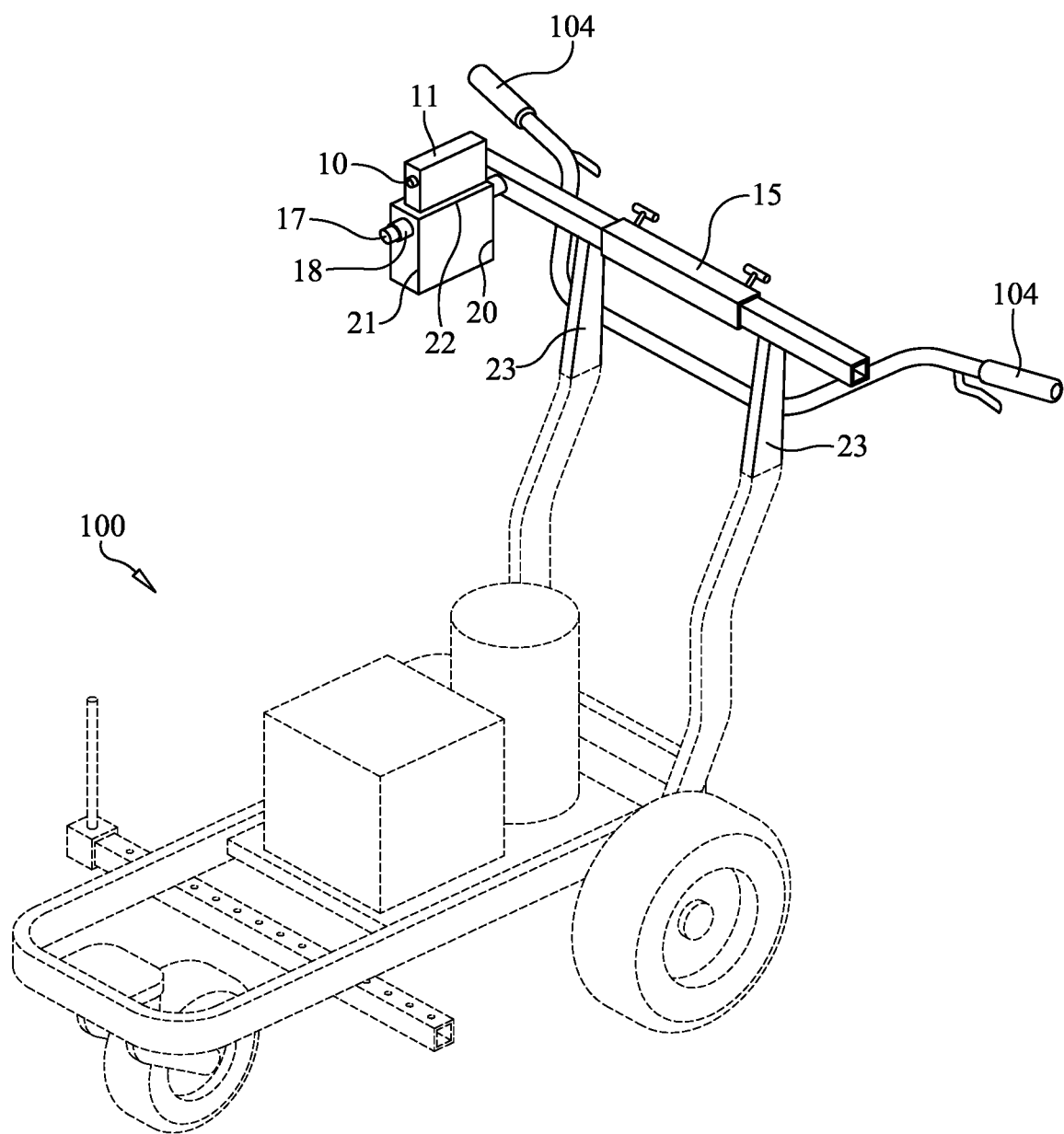
FIG. 1 depicts a perspective view of line striping system 1 in one aspect of the subject technology.
Figure 2:
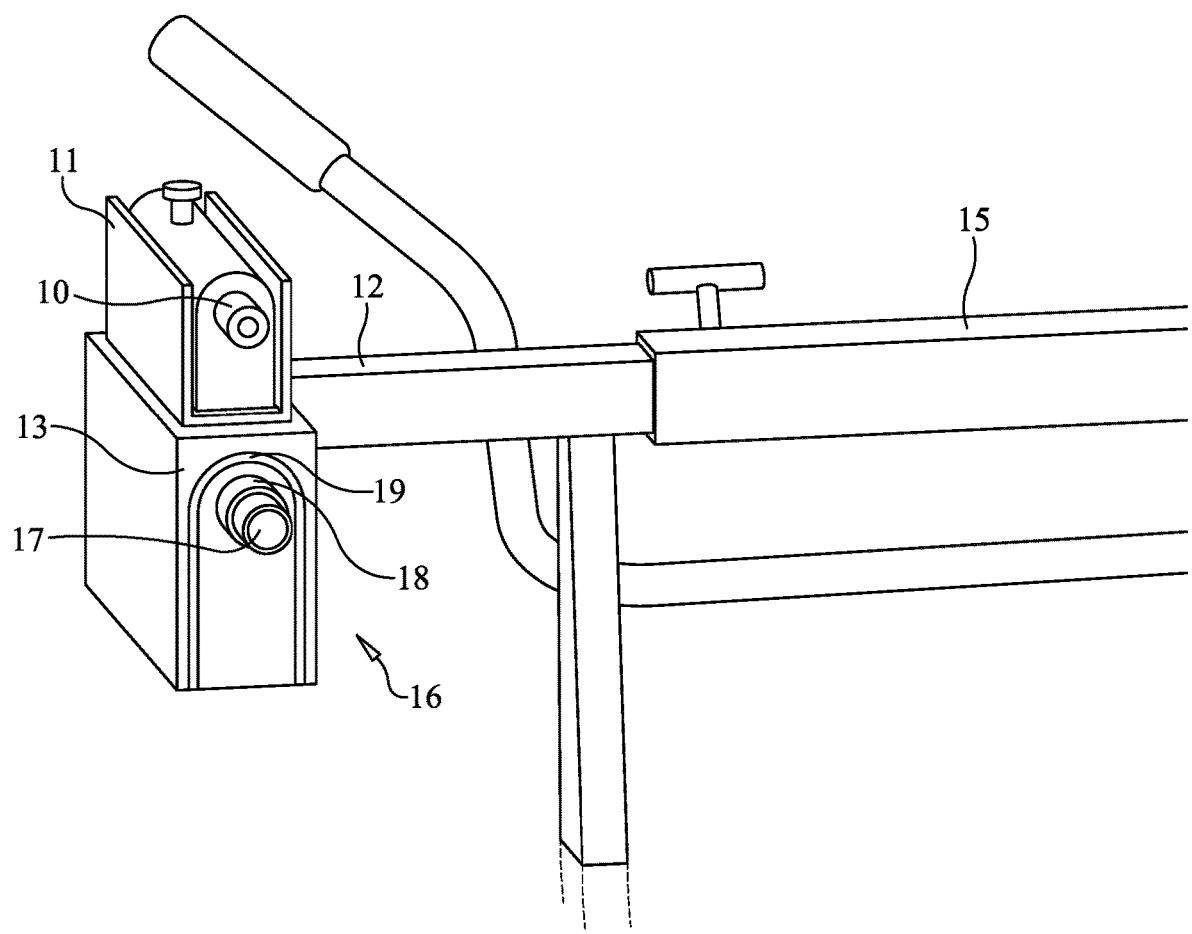
FIG. 2 depicts a perspective view of line display system 16 in one aspect of the subject technology.

The table below lists the reference numerals employed in the figures, and identifies the element designated by each numeral
1 line striping system 1
10 laser 10
11 laser harness assembly 11
12 support arm 12
13 vertical compensator housing 13
14 [unused]
15 support arm housing 15
16 line display system 16
17 shaft 17
18 retaining ring 18
19 bearing 19
20 proximal end 20 of vertical compensator housing 13
21 distal end 21 of vertical compensator housing 13
22 top 22 of vertical compensator housing 13
23 support arm housing braces 23
100 line striping machine 100
101 grade 101
102 vertically compensated projection plane 102
103 skewed projection plane 103
104 handle bar 104
105 reference line 105
106 projection plane 106
107 wheels 107 of line striping machine 100

DETAILED DESCRIPTION

In the discussion that follows, like reference numerals are used to refer to like structures and elements in the various figures.

In one aspect of the subject technology, a line striping system 1 comprises a laser 10 pivotally attached to a line striping machine 100. The laser 10 is adapted to project a planar line. Those of skill in the art will appreciate the various commercially available lasers for projecting reference lines upon surfaces for various purposes. Such lasers transmit in a two dimensional projection plane such that a line will be projected upon a surface within the projection plane, within the range of the laser. The strength, and thus the range, of such lasers are typically regulated for safety or other regulatory reasons. Those of skill in the art will appreciate that "plane" in this sense refers to a projection of light in the visible spectrum, that is restricted (e.g. filtered, polarized) in a projection plane, so as to be perceivable as a line on a surface by a human eye as the projection plane encounters the surface. Accordingly, the dimensions (including thickness) of the projection plane are commensurate with such application.

The laser 10 is adapted to project a planar line outwardly from the line striping machine 100 in a longitudinal direction. Those of skill in the art will appreciate the functionality of causing a reference line to be projected onto a surface (e.g. a parking lot) to allow a line to be painted onto the surface by a line striping machine as a user of the machine follows the reference line. The laser 10 is adapted to freely rotate about a longitudinal axis, under the influence of gravity, relative to the line striping machine 100, independent of the orientation of the line striping machine 100, so as to project a vertically planar line regardless of the vertical orientation of the line striping machine 100. Thus, such a vertically planar line will be projected upon a surface that coincides with the projection plane.

The longitudinal axis about which laser 10 freely rotates, is substantially parallel to the direction of travel of the striping machine. In other words, if a line is to be painted upon a parking lot, the laser is aligned such that it is pointed longitudinally and parallel to the direction that the striping machine is travelling in. The laser 10 could be adapted to rotate about a different axis, should the need arise.

Figure 3:
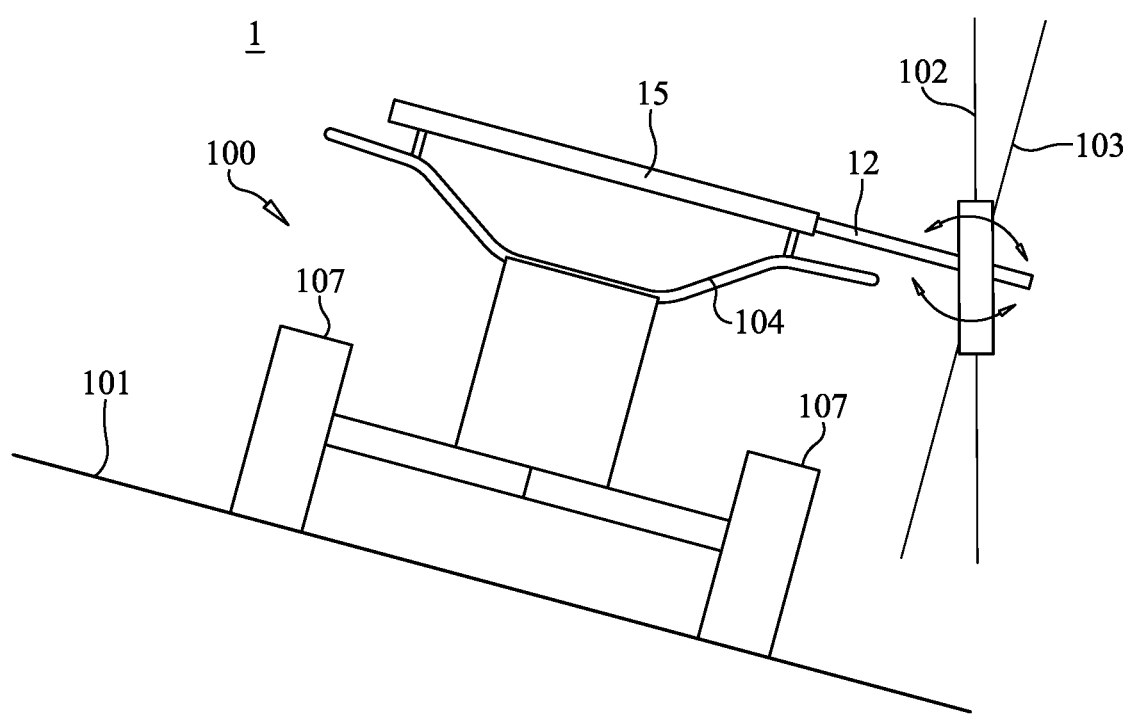
FIG. 3 depicts a rear view of line striping system 1 on a non-horizontal grade 101.
Figure 4:
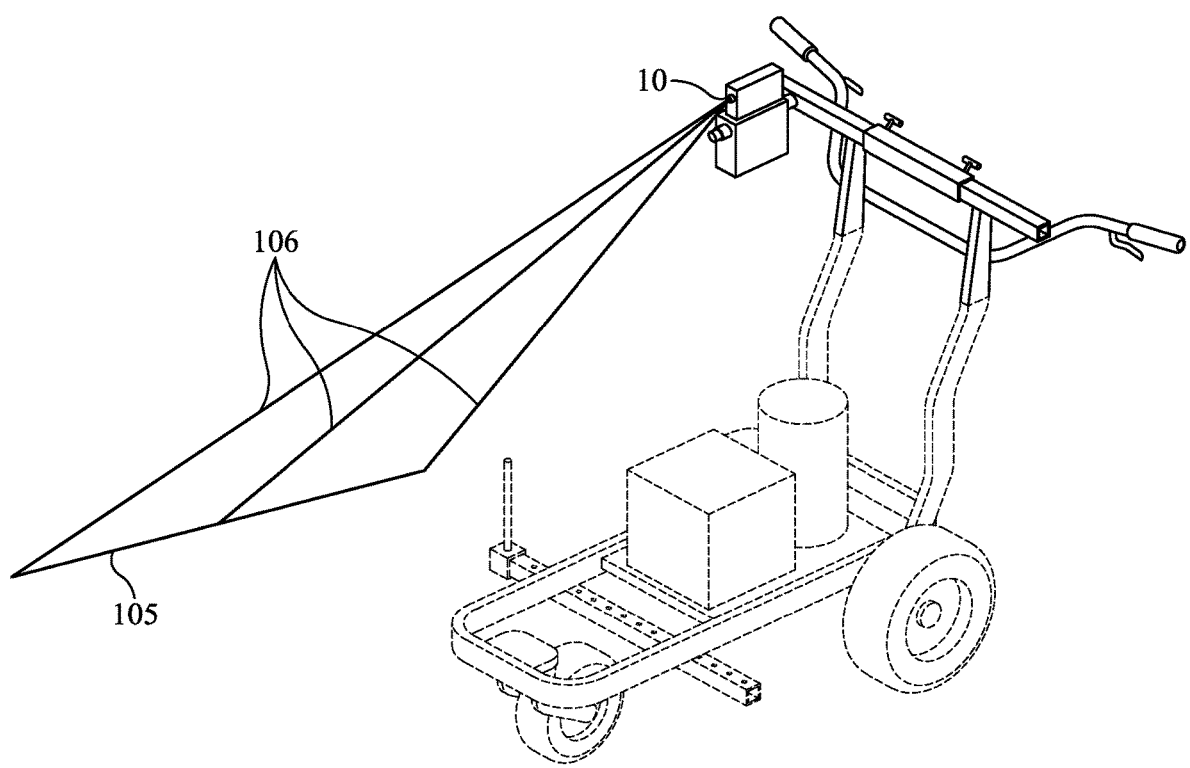
FIG. 4 depicts a perspective view of line striping system 1 in one aspect of the subject technology showing reference line 105 and projection plane 106.

FIG. 4 depicts laser 10 projecting a planar line in a projection plane 106 such that reference line 105 is projected upon a surface. In some situations, a grade (e.g. parking lot) may have a varying contour (FIG. 3) such that the axis of wheels 107 (aka lateral axis) changes as the striping machine travels in a longitudinal direction. The subject technology is adapted to compensate for such changing topology resulting in a painted line that is not adversely affected by the change in contour.

FIG. 3 depicts a rear view of line striping system 1 on a non-horizontal grade 101 that is substantially parallel to the axis of wheels 107. This axis (aka lateral axis) is perpendicular to the longitudinal direction of travel of the striping machine. If the contour changes from horizontal to non-horizontal (relative to the lateral axis), a conventional laser would project a skewed projection plane 103 that would project a skewed line upon a surface. A user following the skewed line would paint a skewed stripe. The subject technology compensates for such changes in topology because laser 10 (and/or vertical compensator housing 13, discussed below) rotates about the longitudinal axis, under the influence of gravity, as the topology changes. This rotation causes the projection plane 106 to likewise rotate resulting in vertically compensated projection plane 102 that causes a vertically compensated reference line 105 unaffected by the change in contour.

In one aspect, the laser 10 is operatively attached to a vertical compensator housing 13 that is pivotally attached to a line striping machine 100. The vertical compensator housing 13 is adapted to freely rotate about a longitudinal axis, under the influence of gravity, relative to the line striping machine 100, independent of the orientation of the line striping machine 100, such that laser 10 projects a vertically planar line regardless of the vertical orientation of the line striping machine 100.

In one aspect, a line striping system 1 comprises a line display system 16 mounted to the line striping machine 100. In one aspect, the line display system 16 is mounted to a handle bar 104 of the line striping machine 100. The line display system 16 comprises a support arm 12 operatively connected to a support arm housing 15, and a vertical compensator housing 13 pivotally attached to the support arm 12 such that the vertical compensator housing 13 freely rotates about a longitudinal axis, under the influence of gravity, relative to the line striping machine 100, independent of the orientation of the line striping machine 100, so as to project a vertically planar line regardless of the vertical orientation of the line striping machine 100. In one aspect, the support arm housing 15 is connected (either removably or fixedly) to the handle bar 104.

In one aspect, the support arm 12 is connected to support arm housing 15 in a telescoping relationship such that support arm 12 can be laterally adjusted and fixed in place by thumb screws or other types of fasteners. In one aspect, this is accomplished by support arm 12 and support arm housing 15 being made from tubular (rectangular or round) material (e.g. metal or sufficiently hard plastic or carbon based material) such that support arm 12 fits inside of support arm housing 15. As depicted (e.g. FIG. 1) support arm 12 is connected on the right side of support arm housing 15. It should be understood that it can alternatively be connected to the left side. In one aspect, the line display system 16 is attached to the line striping machine 100 by support arm housing braces 23 attached to support arm housing 15. In one aspect, the support arm housing braces 23 are attached to the handle bar 104 (e.g. FIG. 1).

The vertical compensator housing 13 (and/or laser 10 in some aspects) rotates relative to the line striping machine 100 (and/or support arm 12 in some aspects) such that when the line striping machine 100 encounters a non-level grade (and thus is not vertically oriented), the vertical compensator housing 13 remains vertically oriented, or plumb (in one plane). The word "plumb" is defined herein to refer to maintaining a vertical gravitational alignment in one plane. Thus, the term varies somewhat from a "plumb bob" that maintains vertical integrity in two dimensions. It should be noted that the vertical compensator housing 13 and/or laser 10 could be adapted to provide such two dimensional compensation using gimbals and/or bearings operatively connected between the vertical compensator housing 13 and/or laser 10 and line striping machine 100.

In one aspect, the vertical compensator housing 13 is pivotally attached to the support arm 12 by a bearing 19 and a shaft 17 connected to the support arm 12. The bearing 19 is operatively connected to the shaft 17. In one aspect, the bearing 19 is radially outside of and encloses a portion of the shaft 17. The vertical compensator housing 13 is operatively connected to the bearing 19 whereby the vertical compensator housing 13 rotates relative to the shaft and support arm 12. In one aspect (FIG. 1), the shaft 17 extends through the vertical compensator housing 13 such that a distal end thereof (the proximal end of the shaft being connected to the support arm 12) protrudes from a distal end 21 of the vertical compensator housing 13 such that a retaining ring 18 can be secured to the distal end of the shaft (e.g. by a thumb screw). It should be noted that the functionality of the bearing as described herein can also be achieved with a gimbal.

In one aspect, the vertical compensator housing 13 is attached to the handle bar 104 of the line striping machine 100 in a manner analogous to the shaft-bearing arrangement described above wherein the shaft is connected directly to the handle bar 104 instead of the support arm 12. In this spirit, it should be understood that the vertical compensator housing 13 (or laser 10) can be attached to other parts of line striping machine 100. It should be understood that the laser (and vertical compensator housing 13 if used) should be adequately weighted to allow rotation influenced by gravity. Laser 10 is energized by various means including internal battery, or alternatively wired to an external battery.

In one aspect (FIG. 1) the laser 10 being operatively connected to the vertical compensator housing 13 comprises the laser 10 operatively connected to a laser harness assembly 11, and the laser harness assembly 11 being attached to a top 22 of the vertical compensator housing 13. In one aspect, laser harness assembly 11 has a u-shaped cross section forming an upwardly oriented channel into which laser 10 is mounted. Laser harness assembly 11 can be removably or securely attached to the top 22 of the vertical compensator housing 13 by various means, including welding. Alternatively, vertical compensator housing 13 can be molded or machined to include laser harness assembly 11.

The functionality and structure of the vertical compensator housing 13 can be varied. For example, the vertical compensator housing 13 could be a structure similar to retaining ring 18. Such a retaining ring could be attached directly to the laser, and also to a bearing, the bearing being fixedly connected to the line striping machine (e.g. to the handle bar). Thus, the design is simplified.

While this invention has been shown and described with respect to detailed embodiments thereof, it will be understood by those skilled in the art that changes in form and detail thereof may be made without departing from the scope of the claims of the invention.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A line striping system comprising:
 a laser pivotally attached to a line striping machine, the laser being adapted to project a planar line;
 the laser being adapted to freely rotate about a longitudinal axis, under the influence of gravity, relative to the line striping machine, independent of the orientation of the line striping machine, so as to project a vertically planar line regardless of the vertical orientation of the line striping machine.

\* \* \* \* \*